(12) United States Patent
Anderson et al.

(10) Patent No.: US 9,469,327 B2
(45) Date of Patent: Oct. 18, 2016

(54) SNOW BIKE FRONT SUSPENSION SYSTEM

(71) Applicant: Jake R. Anderson, Warroad, MN (US)

(72) Inventors: Jake R. Anderson, Warroad, MN (US);
Timothy J. Giese, White Bear Township, MN (US)

(73) Assignee: Jake R. Anderson, Warroad, MN (US)

( * ) Notice: Subject to any disclaimer, the term of this patent is extended or adjusted under 35 U.S.C. 154(b) by 0 days.

(21) Appl. No.: 14/450,600

(22) Filed: Aug. 4, 2014

(65) Prior Publication Data

US 2016/0031471 A1    Feb. 4, 2016

(51) Int. Cl.
*B62M 27/02*      (2006.01)
*B62B 17/04*      (2006.01)

(52) U.S. Cl.
CPC .............. *B62B 17/04* (2013.01); *B62M 27/02* (2013.01); *B62M 2027/021* (2013.01); *B62M 2027/022* (2013.01); *B62M 2027/025* (2013.01); *B62M 2027/026* (2013.01)

(58) Field of Classification Search
CPC  B62M 27/02; B62M 27/021; B62M 27/022; B62M 27/025; B62M 27/026; B62B 13/06; B62B 13/08; B62B 13/12
See application file for complete search history.

(56) References Cited

U.S. PATENT DOCUMENTS

| | | | |
|---|---|---|---|
| 2,371,132 A | 3/1945 | Erle | |
| 3,398,970 A * | 8/1968 | Horiuchi | ......................... 280/16 |
| 3,630,301 A * | 12/1971 | Henricks | ...................... 180/183 |
| 3,667,562 A | 6/1972 | Compton | |
| 3,783,959 A | 1/1974 | Krume | |
| 4,131,292 A | 12/1978 | Swech | |
| 4,132,376 A | 1/1979 | Sharples | |
| 4,375,293 A | 3/1983 | Solbes | |
| 4,437,534 A * | 3/1984 | Grinde | .......................... 180/190 |
| 4,544,170 A * | 10/1985 | Ebert et al. | .................. 280/21.1 |
| 4,613,006 A * | 9/1986 | Moss et al. | .................. 180/9.25 |
| 4,643,444 A | 2/1987 | Parkinson | |
| 4,826,185 A | 5/1989 | Blanchard | |
| 5,102,153 A | 4/1992 | Rhode | |
| 5,503,242 A | 4/1996 | Jeffers | |
| 5,586,614 A * | 12/1996 | Kouchi et al. | ................ 180/190 |
| 5,829,545 A * | 11/1998 | Yamamoto et al. | .......... 180/190 |
| 6,283,254 B1 | 9/2001 | Bibollet | |
| 7,182,165 B1 | 2/2007 | Keinath | |
| 8,121,757 B2 | 2/2012 | Song | |
| 8,371,524 B2 | 2/2013 | Chow | |
| 2008/0017431 A1* | 1/2008 | Sadakuni et al. | ............. 180/193 |
| 2008/0029324 A1 | 2/2008 | Plankenhorn | |
| 2014/0035255 A1 | 2/2014 | Erickson | |

OTHER PUBLICATIONS www.timbersled.com/sbmodels.htm; Mountain Horse Models Webpage by Timbersled Products; Received and Printed May 28, 2014.

(Continued)

*Primary Examiner* — Frank Vanaman
(74) *Attorney, Agent, or Firm* — Neustel Law Offices; Michael S. Neustel (57) ABSTRACT

A snow bike front suspension system for improving the handling and ride quality for a snow bike. The snow bike front suspension system generally includes an upper bracket attached to the upper legs of a motorcycle's telescopic forks, at least one support arm attached to the lower leg of the telescopic forks and a guide arm pivotally connected between the upper bracket and the support arms to maintain the alignment of the support arms.

3 Claims, 9 Drawing Sheets

(56) References Cited

OTHER PUBLICATIONS www.off-road.com/dirtbike/timbersled-snowbike-dirt-bike-conversion-53327.html; Timbersled Snowbike Dirt Bike Conversion Webpage by Off-Road.com; Received and Printed May 28, 2014.
http://commons.wikimedia.org/wiki/File:Yamaha_Exciter_1989mod.JPG; File:Yamaha Exciter 1989mod.JPG Webpage by Wikimedia Commons; Received and Printed Jun. 25, 2014.
http://upload.wikimedia.org/wikipedia/commons/thumb/a/a6/Yamaha_Exciter_1989mod.JPG/1280px-Yamaha_Exciter_1989mod.JPG; Yamaha Exciter 1989 Webpage; Received & Printed Jun. 25, 2014.
http://www.cannondale.com/innovation/lefty_headshok/; Lefty Webpage by Cannondale Bicycle; Received and Printed Jun. 25, 2014.

* cited by examiner

SNOW BIKE FRONT SUSPENSION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a snow bike front suspension and more specifically it relates to a snow bike front suspension system for improving the handling and ride quality for a snow bike.

2. Description of the Related Art

Any discussion of the related art throughout the specification should in no way be considered as an admission that such related art is widely known or forms part of common general knowledge in the field.

Snow bikes are comprised of a conventional motorcycle (typically an off-road motorcycle) converted to have a track similar to a snowmobile for the rear suspension and a single ski attached to the front for the front suspension. Conventional snow bike kits are available that include a track for the rear suspension and a single ski for the front suspension.

While conventional snow bikes allow a user to operate the motorcycle upon a snow surface similar to a snowmobile with increased mobility, one of the major limitations is the single ski used for the front suspension. For example, one of the problems with conventional single ski designs is the roll stiffness when the rider leans the snow bike to the left or ride side. Another problem with conventional single ski designs is the limited amount of load carrying capabilities because a single ski is limited in the amount of width and length due to reduced handling traits as the single ski is enlarged.

Because of the inherent problems with the related art, there is a need for a new and improved snow bike front suspension system for improving the handling and ride quality for a snow bike.

BRIEF SUMMARY OF THE INVENTION

The invention generally relates to a snow bike front suspension which includes an upper bracket attached to the upper legs of a motorcycle's telescopic forks, at least one support arm attached to the lower leg of the telescopic forks and a guide arm pivotally connected between the upper bracket and the support arms to maintain the alignment of the support arms.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Turning now descriptively to the drawings, in which similar reference characters denote similar elements throughout the several views, FIGS. 1 through 9 illustrate a snow bike front suspension system 10, which comprises an upper bracket 20 attached to the upper legs 17 of a motorcycle's telescopic forks 16, at least one support arm 30 attached to the lower leg 18 of the telescopic forks 16 and a guide arm 40 pivotally connected between the upper bracket 20 and the support arms 30 to maintain the alignment of the support arms 30.

B. Upper Bracket.

Figure 1:
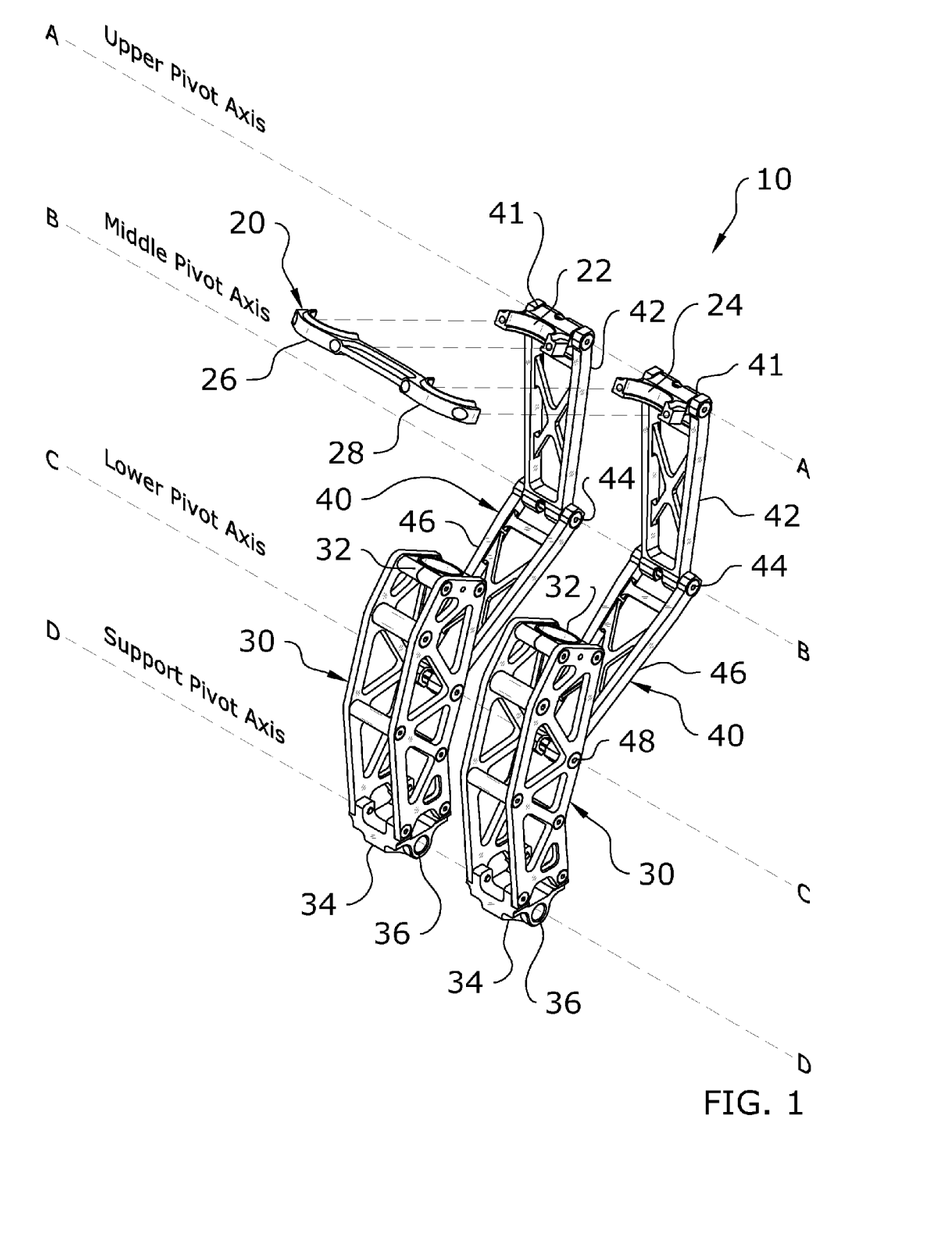
FIG. 1 is an upper perspective view of the present invention.
Figure 2:
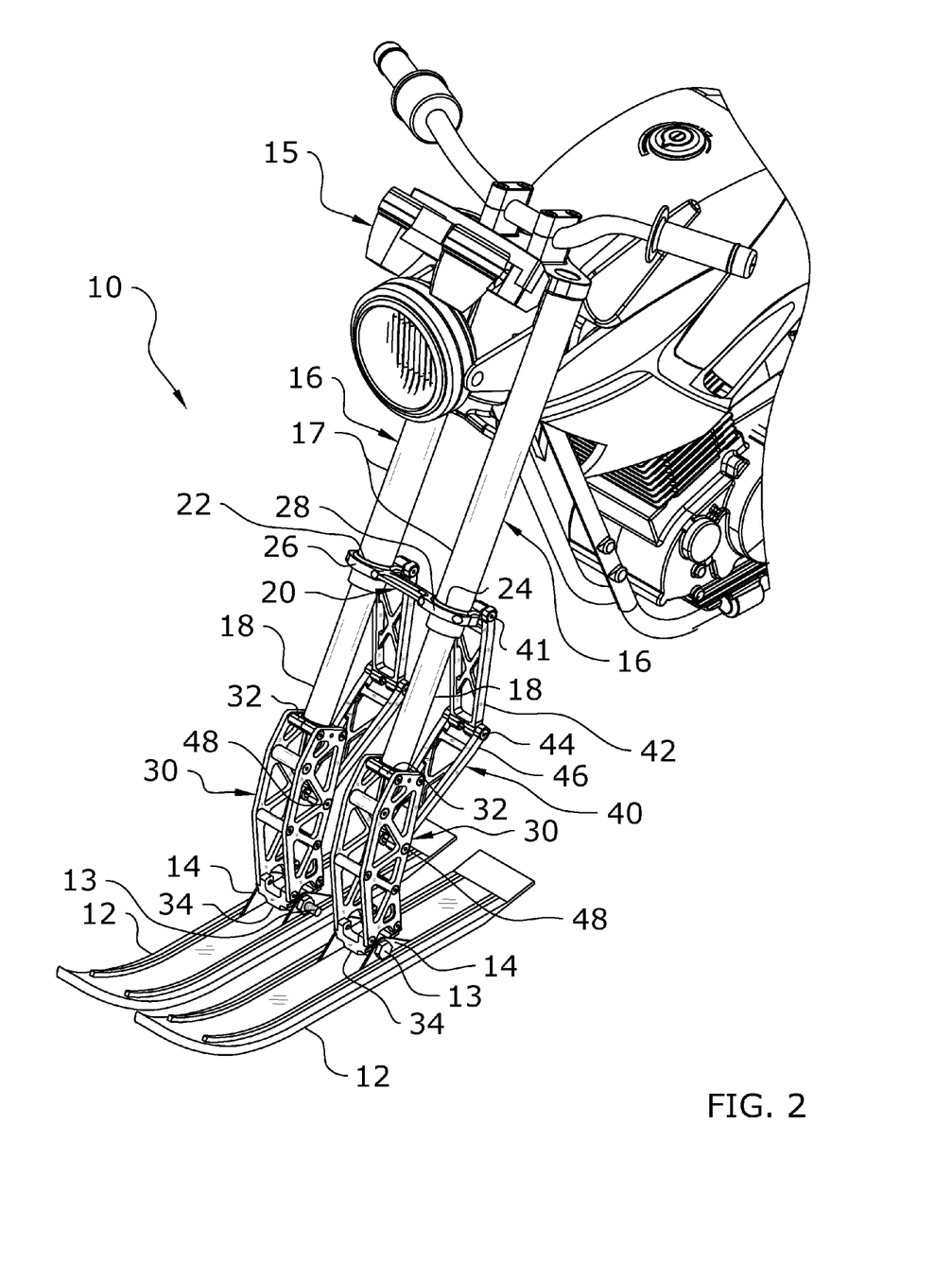
FIG. 2 is an upper perspective view of the present invention attached to the telescopic forks of a motorcycle.

FIGS. 1 through 9 illustrate the upper bracket 20 attached between the upper legs 17 of the telescopic forks 16 of the motorcycle 15 (the term motorcycle is used interchangeably with snow bike). The telescopic forks 16 are typically comprised of a pair of upper legs 17 that are slidably and telescopically connected to a corresponding pair of lower legs 18 as illustrated in FIG. 2 of the drawings. The upper legs 17 may be comprised of fork tubes and the lower legs 18 may be comprised of fork legs that slidably extend from within the upper legs 17 (and vice versa). The telescopic forks 16 include a compression spring or other biasing system that forces the lower leg 18 from the upper leg 17 which is well known in the art of motorcycles 15.

Figure 3:
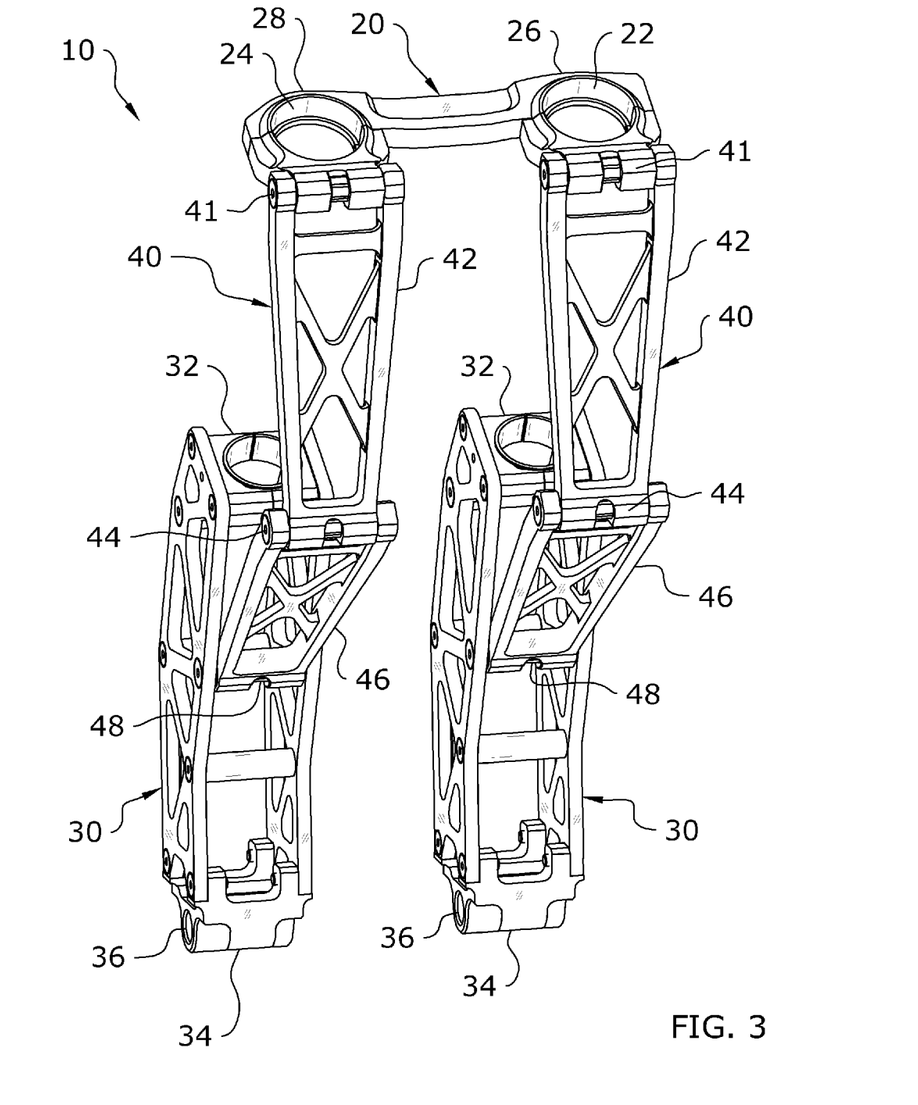
FIG. 3 is a rear upper perspective view of the present invention.

The upper bracket 20 preferably is comprised of a first upper clamp 26 having a first upper opening 22 that receives a first upper leg 17 and a second upper clamp 28 having a second upper opening 24 that receives a second upper leg 17 of the telescopic forks 16 as illustrated in FIGS. 1 and 2 of the drawings. The first upper clamp 26 and the second upper clamp 28 may be separate from one another, but it is preferable that the first upper clamp 26 is connected to the second upper clamp 28 by a cross member as illustrated in FIGS. 1 through 3 of the drawings to assist in the stability of the upper bracket 20. The clamps 26, 28 are preferably comprised of a split clamp structure that is secured tightly in a non-movable manner about the upper legs 17 by the tightening of fasteners. The upper bracket 20 is preferably parallel with respect to the upper pivot axis (line A-A) discussed herein.

C. Support Arm.

Figure 6:
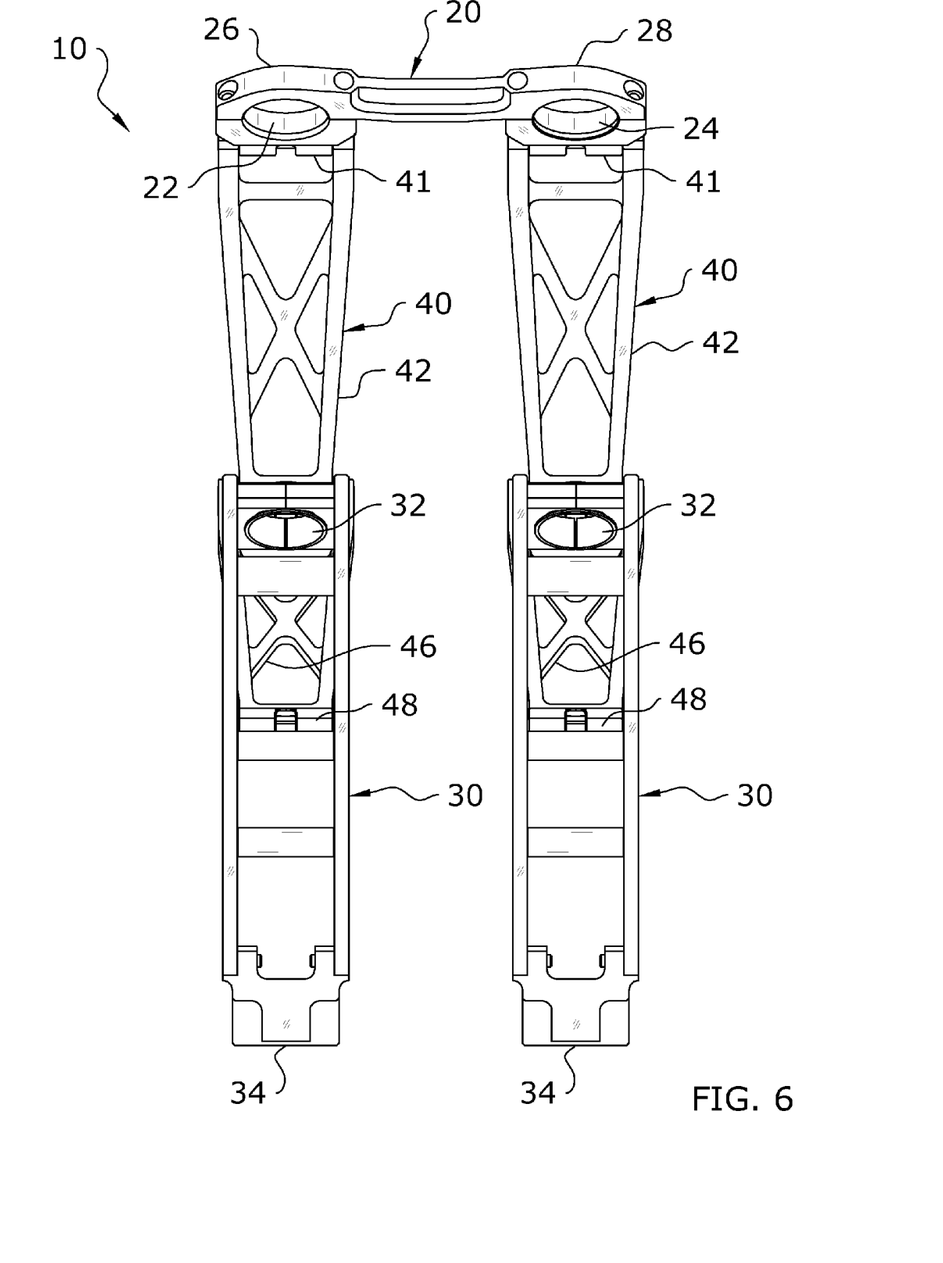
FIG. 6 is a front view of the present invention.
Figure 7:
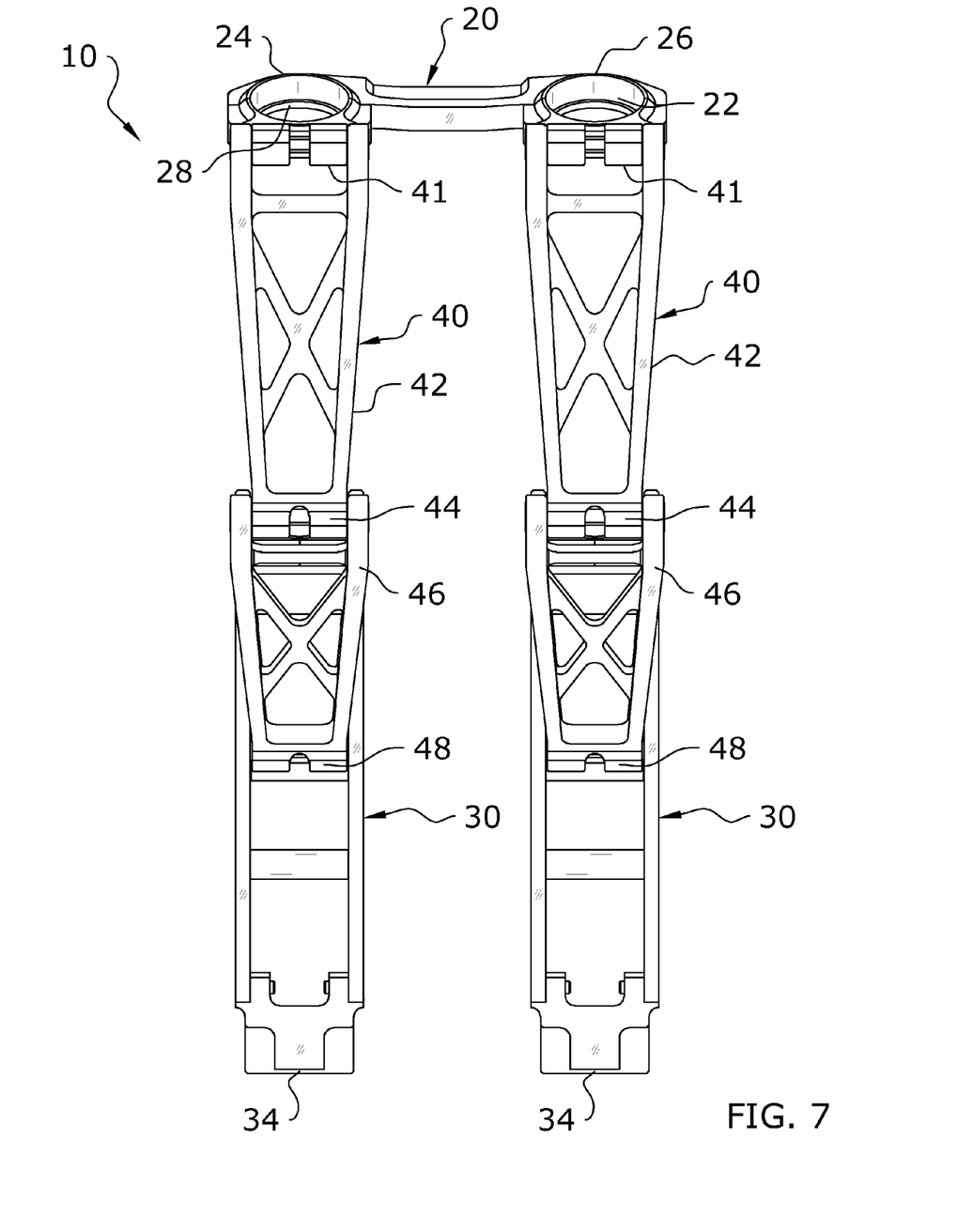
FIG. 7 is a rear view of the present invention.
Figure 8:
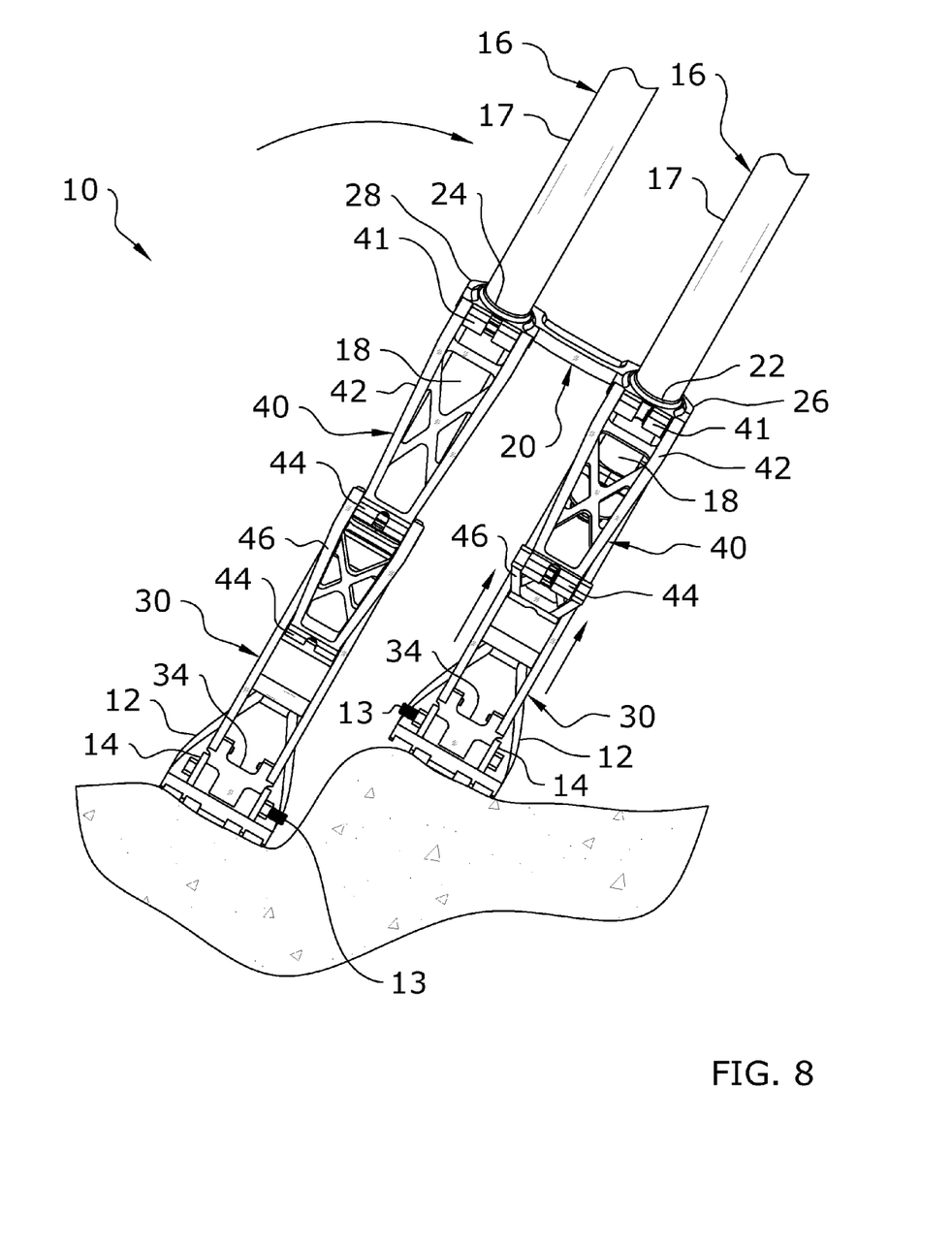
FIG. 8 is a rear view of the present invention with the right telescopic fork compressed and the left telescopic fork extended when the snow bike is leaning to the right.
Figure 9:
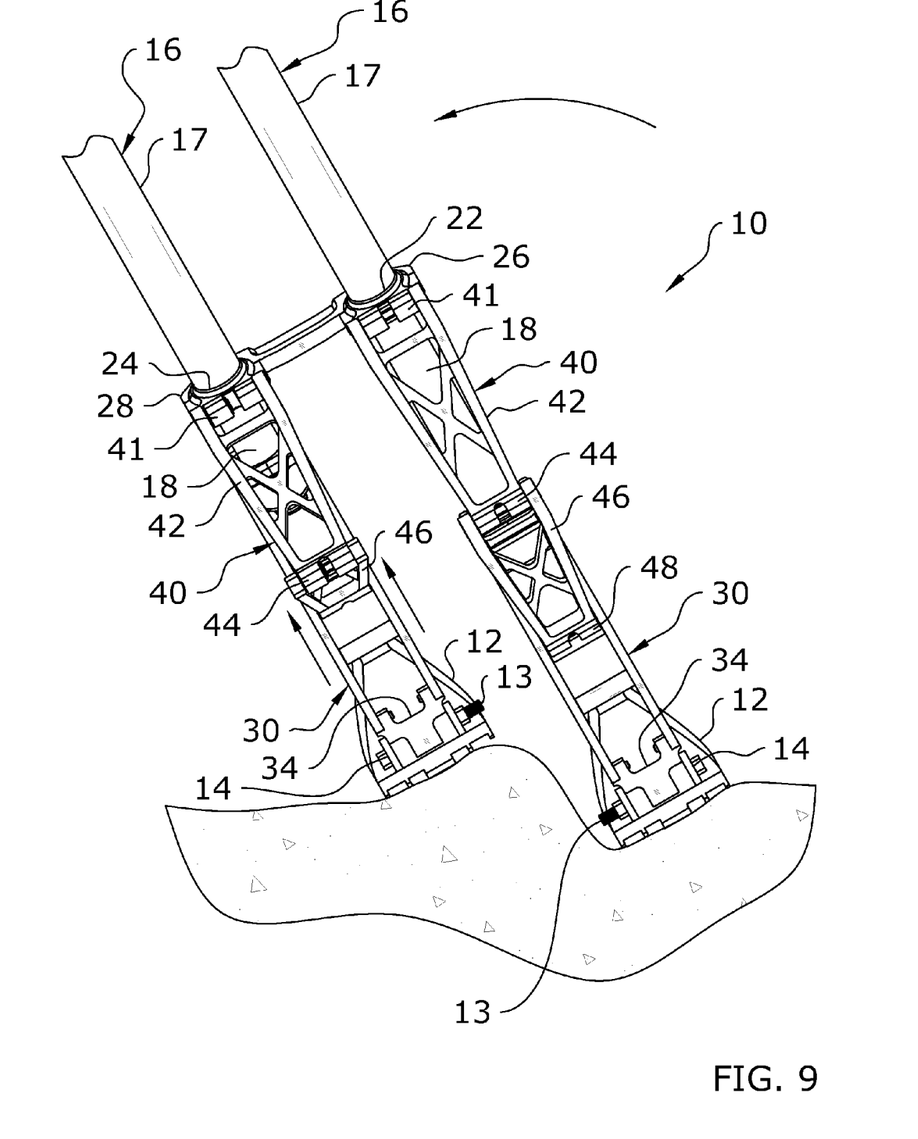
FIG. 9 is a rear view of the present invention with the left telescopic fork compressed and the right telescopic fork extended when the snow bike is leaning to the left.

For the purposes of discussion only a single support arm 30 will be discussed, but the present invention may utilize 1, 2 or more support arms 30 to support a corresponding number of skis 12. In a preferred embodiment of the present invention, two support arms 30 are utilized that independently support two corresponding skis 12 as illustrated in FIGS. 2, 8 and 9 of the drawings. However, a single ski 12 and a single support arm 30 may be utilized within the present invention. The support arms 30 preferably have the same structure as illustrated in FIGS. 1 through 9 of the drawings. FIGS. 1 through 9 illustrate the support arm 30 which is adapted to be attached to a lower leg 18 of a telescopic fork 16.

A ski 12 is attached to a lower end 34 of the support arm 30 as illustrated in FIGS. 2, 8 and 9 of the drawings. The ski 12 is preferably pivotally attached to the lower end 34 of the support arm 30 about a support pivot axis (line D-D) that the ski pivots about. A spring or other biasing device may be connected between the ski and the support arm 30 to apply a biasing force between the ski 12 and the support arm 30. The ski 12 is designed and adapted to be slid across a snow surface. The ski 12 includes a mounting bracket 14 that receives a spindle 13 that extends through a mounting aperture 36 within the lower end 34 of the support arm 30.

The support arm 30 is connected to the lower portion of the lower leg 18 utilizing a lower clamp 32 as illustrated in FIGS. 1 through 3 of the drawings. The lower clamp 32 is preferably comprised of a split clamp similar to the upper clamps 26, 28. The lower clamp 32 is tightened upon the lower portion of the lower leg 18 to securely attach the support arm 30 to the lower leg 18.

The support arm 30 is illustrated having a pair of opposing truss-like structures attached to one another to provide reduced weight. It can be appreciated that the support arm 30 may be constructed of solid panel structures suitable for usage in supporting a ski 12.

D. Guide Arm.

For the purposes of discussion only a single guide arm 40 will be discussed, but the present invention may utilize 1, 2 or more guide arms 40 to guide a corresponding number of support arms 30 and skis 12. In a preferred embodiment of the present invention, two guide arms 40 are utilized that independently prevent the rotation of two corresponding support arms 30 and skis 12 as illustrated in FIGS. 2, 8 and 9 of the drawings. However, a single ski 12, a single support arm 30 and a single guide arm 40 may be utilized within the present invention. The guide arms 40 preferably have the same structure as illustrated in FIGS. 1 through 9 of the drawings.

The guide arm 40 is adapted to be attached between an upper leg 17 of the telescopic fork 16 about an upper pivot axis (line A-A) and the support arm 30 or the lower leg 18 about a lower pivot axis (line C-C). It is preferable that the guide arm 40 is pivotally attached to the mounting bracket 22, 24 by an upper hinge 41 as illustrated in FIGS. 1 through 3 of the drawings. It is further preferable that the guide arm 40 is pivotally attached to the support arm 30 by a lower hinge 48. The guide arm 40 prevents the support arm 30 from rotating with respect to the upper leg 17.

The guide arm 40 is pivotally attached to the support arm 30 about the lower pivot axis. The lower pivot axis is preferably transverse with respect to a longitudinal axis of the telescopic fork 16 to allow for free pivoting when the telescopic fork 16 extends and contracts.

The guide arm 40 is adapted to be pivotally attached to the upper leg 17 of the telescopic fork 16 about the upper pivot axis. The upper pivot axis is also preferably transverse with respect to a longitudinal axis of the telescopic fork 16. The upper pivot axis is preferably parallel with respect to the lower pivot axis to allow for a constant plane of movement for the guide arm 40 as the telescopic fork 16 extends and contracts.

Figure 4:
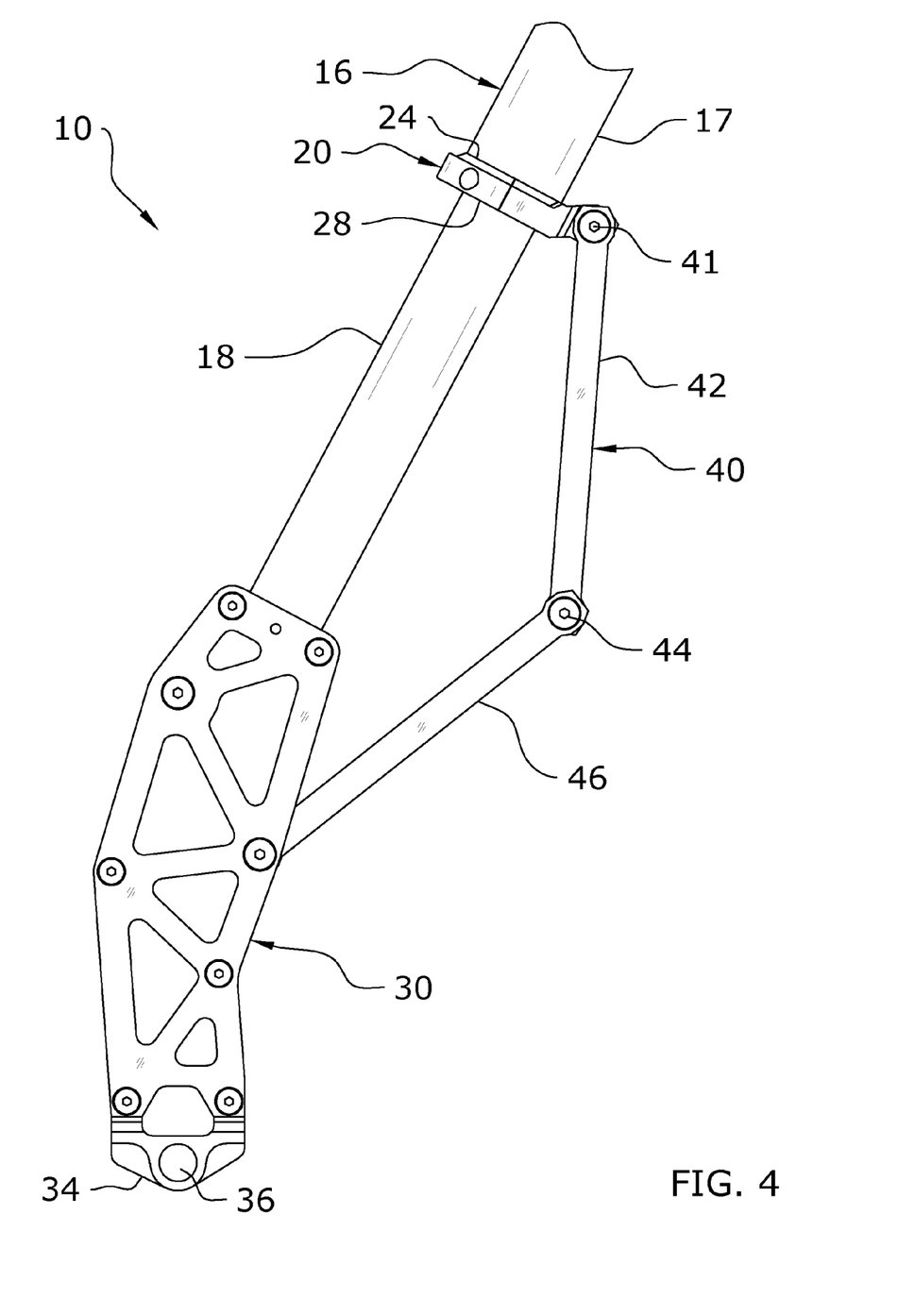
FIG. 4 is a side view of the present invention attached to telescopic forks in a non-compressed state.
Figure 5:
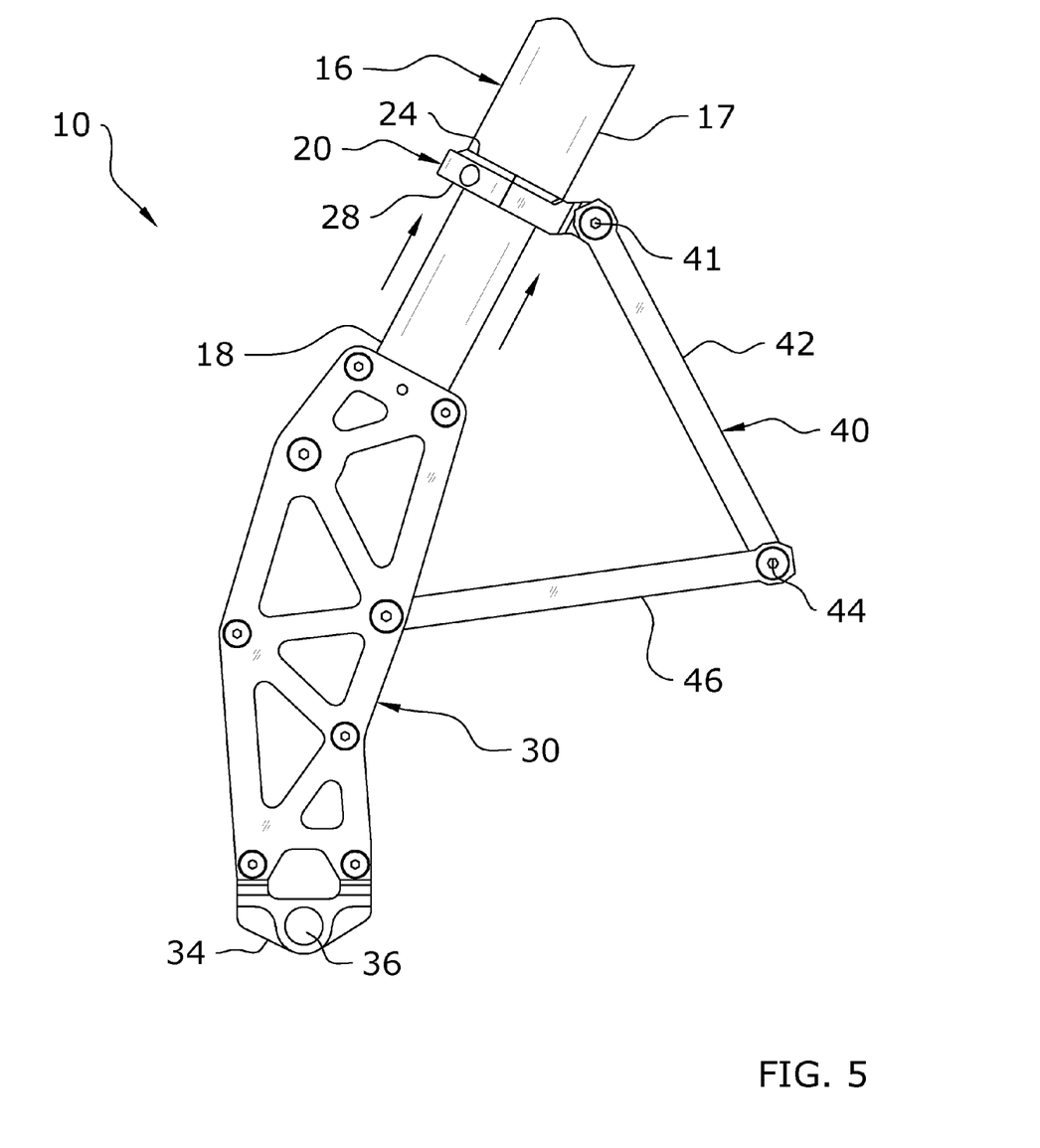
FIG. 5 is a side view of the present invention attached to telescopic forks in a compressed state.

As illustrated in FIGS. 1 through 9 of the drawings, the guide arm 40 is preferably comprised of a first arm 42 pivotally connected to second arm 46 about a middle pivot axis (line B-B). The first arm 42 is further preferably pivotally connected to the upper hinge 41 that is connected to the upper bracket 20 and the second arm 46 is preferably pivotally connected to the lower hinge 48 that is connected to the support arm 30. The first arm 42 is pivotally connected to the second arm 46 by a middle hinge 44 that is positioned between the arms 42, 46. The length of the first arm 42 and the second arm 46 is preferably the same as illustrated in FIG. 4 of the drawings, however, the arms 42, 46 may have different lengths. In addition, when the telescopic forks 16 are extended outwardly the same distance, each of the support arms 30 and guide arms 40 have a common upper pivot axis, a common middle pivot axis, a common lower pivot axis and a common support pivot axis as illustrated in FIG. 1 of the drawings. The upper pivot axis is preferably the same for both of the guide arms 40 regardless of the position or respective states of the telescopic forks 16.

The guide arms 40 have a sufficient width that prevents rotation of the support arms 30, the lower legs 18 and the skis 12. The guide arms 40 preferably have a width greater than the width of the lower leg 18 as illustrated in FIGS. 6 and 7 of the drawings. The guide arms 40 further preferably have a pair of opposing side braces that have cross members between thereof as best illustrated in FIG. 7 of the drawings.

The middle pivot axis, the lower pivot axis and the upper pivot axis are all preferably parallel with respect to one another. The ski 12 is pivotally connected to the support arm 30 about a support pivot axis, wherein the support pivot axis is parallel with respect to the middle pivot axis, the lower pivot axis and the upper pivot axis.

E. Alternative Embodiment—Non-Rotatable Telescopic Forks.

In an alternative embodiment of the present invention, one or more telescopic forks 16 are configured so that the lower leg 18 does not rotate with respect to the upper leg 17 of the respective telescopic forks 16 thereby eliminating the need for the guide arms 40. Hence, the support arm 30 and the ski 12 would be attached to the lower leg 16 without the guide arm 40 being attached. For example, the lower leg 16 and the upper leg 17 may have an oval, square or rectangular cross sectional shape instead of circular to prevent rotation of the lower leg 16 with respect to the upper leg 17 thereby maintaining the ski 12, the lower leg 16 and the support arm 30 in a rotational static position with respect to the upper leg 17. U.S. Pat. No. 8,121,757 to Song et al. titled "Bicycle User Interface System and Method of Operation Thereof" discloses a suitable front suspension comprised of a telescopic fork that is positioned on one side of the front wheel of the bicycle wherein the lower leg does not rotate with respect to the upper leg that is suitable for usage in the present invention and is incorporated by reference herein in its entirety.

F. Operation of Preferred Embodiment.

In use, the user removes the front wheel of the motorcycle 15 and attaches the support arms 30 to the lower portions of the lower legs 18 of the telescopic forks 16 as illustrated in FIG. 2 of the drawings. The support arms 30 are aligned with respect to one another so that the skis 12 are parallel with respect to one another as shown in FIGS. 2, 8 and 9 of the drawings. The user also connects the upper bracket 20 to the upper legs 17 of the telescopic forks 16 as shown in FIGS. 2, 8 and 9 of the drawings. The guide arms 40 are preferably connected at the factory between the support arm 30 and the upper bracket 20 so that alignment of the skis 12 is relatively automatic based upon the attachment to the telescopic forks 16. The user then attaches the skis to the lower ends 34 of the support arms 30.

The rider operates the snow bike in a manner similar to a motorcycle 15 steering the skis 12 by rotating the handle bars and leaning to the side when riding through a corner. When the rider leans to the left side, the left telescopic fork 16 is compressed and the right telescopic fork 16 extends outwardly thereby maintaining contact with the snow surface by both skis 12 at all time and reducing the amount of roll stiffness thereby allowing the rider to easily lean the snow bike. FIGS. 8 and 9 illustrate the different compression and extension of the pair of telescopic forks 16 based upon the direction the rider leans the snow bike 15. The guide arms 40 prevent rotation of the skis 12, the support arms 30 and the lower legs 18 with respect to the corresponding upper legs 17 thereby ensuring that the skis 12 maintain a constant position with respect to the upper legs 17 at all times regardless of the compression or extension status of the respective telescopic forks 16.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A snow bike front ski support system, comprising:
   a support arm adapted to be attached to a lower leg of a telescopic fork, wherein said support arm is elongated having a vertical dimension substantially greater than a horizontal dimension;
   a ski having a mounting bracket, wherein said mounting bracket is attached to a lower end of said support arm; and
   a guide arm adapted to be attached between an upper leg of said telescopic fork and said support arm or said lower leg, wherein said guide arm prevents said support arm from rotating with respect to said upper leg, wherein said guide arm is pivotally attached to said support arm about a lower pivot axis;
   wherein said guide arm is adapted to be pivotally attached to said upper leg of said telescopic fork about an upper pivot axis;
   wherein said guide arm is comprised of a first arm pivotally connected to a second arm about a middle pivot axis;
   wherein said mounting bracket of said ski is pivotally connected to said support arm about a support pivot axis;
   wherein said support pivot axis, said middle pivot axis, said lower pivot axis and said upper pivot axis are all parallel with respect to one another.

2. The snow bike front ski support system of claim 1, wherein said lower pivot axis is transverse with respect to a longitudinal axis of said telescopic fork.

3. The snow bike front ski support system of claim 1, wherein said upper pivot axis is transverse with respect to a longitudinal axis of said telescopic fork.

\* \* \* \* \*